United States Patent [19]
Weinstein

[11] 3,988,032
[45] Oct. 26, 1976

[54] MOTOR VEHICLE TRUNK ACCESSORY

[76] Inventor: Howard M. Weinstein, 340 W. 5th St., Ship Bottom, N.J. 08008

[22] Filed: Feb. 28, 1975

[21] Appl. No.: 553,917

[52] U.S. Cl. .............................. 296/76; 24/221 R; 105/464; 105/473; 224/42.4
[51] Int. Cl.² .................. B62D 25/12; B60R 11/00
[58] Field of Search ............. 296/76, 1 C; 105/466, 105/473, 475, 485, 464; 292/288; 248/354 D, 503; 224/42.03 R, 42.4, 42.45 R; 24/73 RM, 221 R, 221 L

[56] References Cited
UNITED STATES PATENTS

| | | |
|---|---|---|
| 2,260,048 | 10/1941 | Newell .............................. 24/221 R |
| 2,442,266 | 5/1948 | Davis ................................... 105/473 |
| 2,916,902 | 12/1959 | Wamsley ........................... 296/76 X |
| 3,273,935 | 9/1966 | Carson ................................... 296/76 |

FOREIGN PATENTS OR APPLICATIONS 415,147  12/1966  Switzerland ...................... 24/221 R

*Primary Examiner*—L. J. Paperner
*Assistant Examiner*—Randolph A. Reese
*Attorney, Agent, or Firm*—Robert K. Youtie

[57] ABSTRACT

A trunk accessory for a motor vehicle wherein at least a pair of anchors are respectively secured to the floor and closure of a trunk, and releasable strap means extends between the anchors for limiting opening movement of the closure and retaining trunk contents substantially within an open trunk.

2 Claims, 7 Drawing Figures

U.S. Patent  Oct. 26, 1976  3,988,032
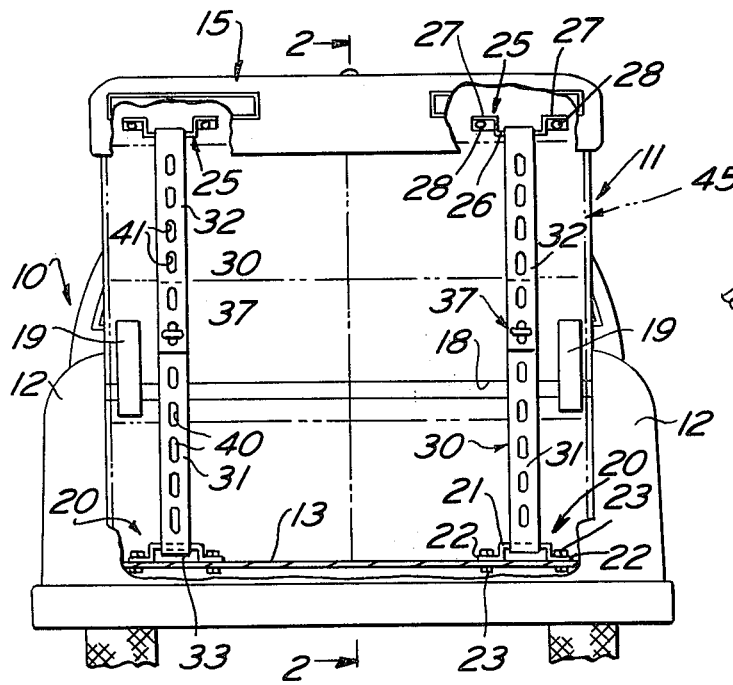
FIG.1
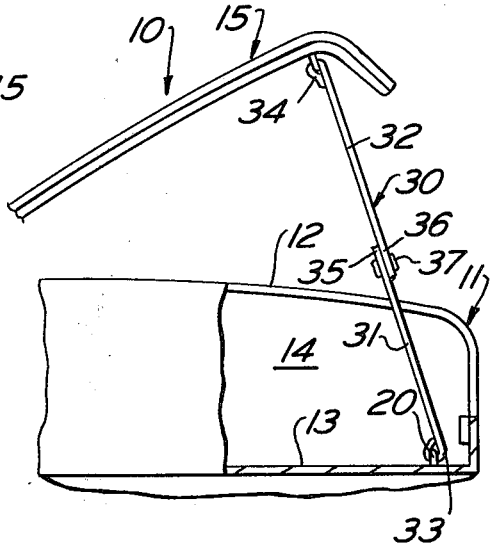
FIG.2
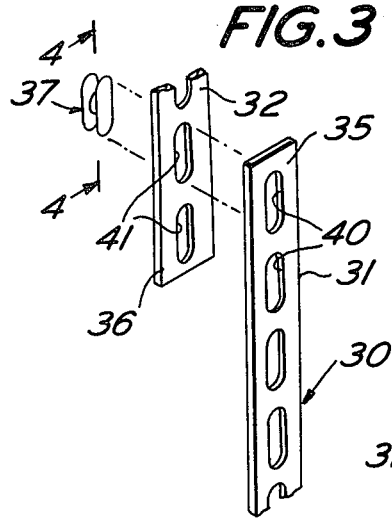
FIG.3
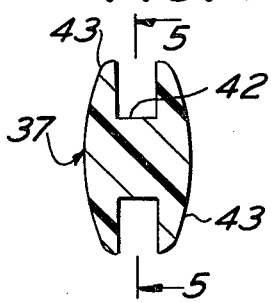
FIG.4
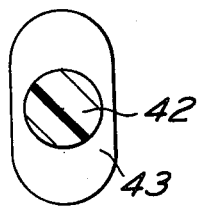
FIG.5
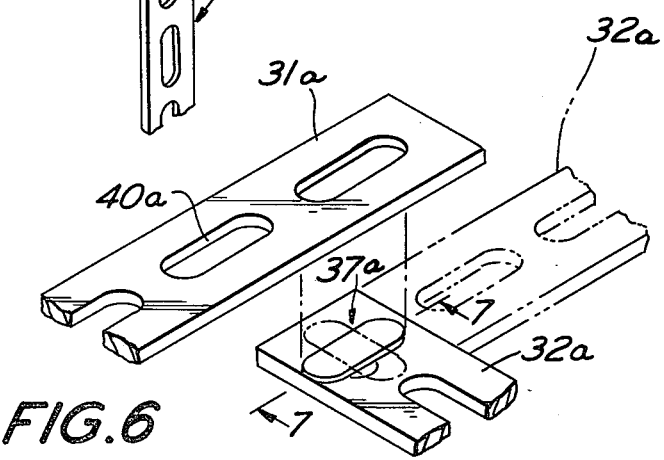
FIG.6
FIG.7

MOTOR VEHICLE TRUNK ACCESSORY

BACKGROUND OF THE INVENTION

While there have, in the past, been provided a variety of article holding devices for use in motor vehicles and compartments thereof, such devices have usually been complex and expensive in construction, difficult to install and operate, and lacking in versatility for different sizes and types of vehicles.

SUMMARY OF THE INVENTION

Accordingly, it is an important object of the present invention to provide an automotive vehicle accessory of the type described which overcomes the above-mentioned difficulties, is extremely simple in structure for simplicity in maintenance and use, durability and reliability throughout a long effective life, being highly economical in manufacture and extremely versatile for use in substantially all sizes and types of motor vehicles.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a rear elevational view of a motor vehicle having the device of the present invention installed in the trunk thereof, and partly broken away for clarity of illustration.

FIG. 2 is a generally longitudinal sectional elevational view taken substantially along the line 2-2 of FIG. 1.

FIG. 3 is a partial perspective view showing belt means elements in an exploded condition.

FIG. 4 is a sectional view taken generally along the line 4—4 of FIG. 3.

FIG. 5 is a sectional view taken generally along the line 5—5 of FIG. 4.

FIG. 6 is an exploded fragmentary perspective view showing a slightly modified construction of belt means, illustrating an alternate position in phantom.

FIG. 7 is a sectional view taken generally along the line 7—7 of FIG. 6.

DESCRIPTION OF THE PREFERRED EMBODIMENTS

Referring now more particularly to the drawings, and specifically to FIGS. 1 and 2 thereof, a motor vehicle is there generally designated 10, and may be any conventional vehicle, say a passenger vehicle having a trunk, generally designated 11, which may be located in the rearward region of the vehicle.

In the conventional manner, the trunk 11 may include sides or side walls 12 encompassing a generally horizontal, upwardly facing bottom wall or floor 13 and combining with the latter to define a storage space or chamber 14 opening upwardly between the sides.

A trunk cover, top or closure is generally designated 15 and is movable into and out of a closed position spacedly overlying the trunk bottom wall or floor 13 and extending between the upper regions of trunk sides 12. The trunk cover or closure 15 has one region, say its forward edge region 18, hingedly or swingably secured to the body of vehicle 10, as by suitable hinges 19. In this manner, the trunk closure or cover 15 is mounted at its forward region 18 by the hinges 19 for up and down swinging movement between a raised, open position, shown in FIGS. 1 and 2, and a lowered, closed position extending between and in closing relation with the upper regions of side walls 12.

Within the trunk space or chamber 14, mounted on and fixedly secured to the trunk bottom wall or floor 13 and upstanding from a rearward region thereof, are one or more anchors 20. As illustrated, there may be a pair of laterally spaced anchors 20 fixedly secured to the trunk floor 13 remote from the forward region thereof. Each anchor 20 may comprise a generally U-shaped central part 21 arranged in inverted disposition, and having a pair of securement tabs or ears 22 extending outwardly from opposite ends of the U-shaped region. The ears or tabs 22 may rest on the upper surface of trunk floor or bottom wall 13, being secured fast to the latter by suitable fastener means 23, such as threaded fasteners or bolts.

Thus, the pair of upstanding, inverted U-shaped anchors or brackets 20 are disposed in laterally spaced relation within the trunk, in general alignment with each other transversely of the vehicle axis.

One or more upper anchors or closure brackets 25 is carried on the underside of trunk cover or closure 15 at a rearward region thereof, remote from the forward edge 18 and hinge means 19. In particular, a pair of closure anchors or brackets 25 may be suitably secured to the under side or interior of the trunk closure 15. Each anchor or bracket may include a generally U-shaped intermediate part 26 depending from the under side of the trunk cover, and a pair of laterally outwardly oppositely extending tabs or ears 27 on opposite ends of the U-shaped member 26. The ears or tabs 27 of each bracket or anchor 25 are disposed against the under surface of the trunk cover 15, and suitably secured fast to the trunk cover, as by fastener means 28. The fastener means 28 may be conventional threaded elements, or other suitable fastener means, as desired.

The closure anchors 25 are located in laterally spaced apart relation with respect to each other, being in alignment with each other transversely of the longitudinal dimension of the vehicle, and each generally over a respective lower, chamber anchor 20 when the trunk closure is closed. Thus, the pair of closure anchors 25 are movable with the carrying closure 15 upon swinging movement of the latter toward and away from the pair of chamber anchors 20. Further, the leftward pair of closure and chamber anchors 25 and 20 may be considered as in vertical alignment with each other longitudinally of the vehicle 10; and, similarly the rightward pair of upper and lower anchors or brackets 25 and 20 may be considered as in vertical alignment longitudinally of the vehicle.

Extending between each vertically aligned pair of upper and lower brackets or anchors 25 and 20 is an extensile and contractile strap or tie means, generally designated 30. Each strap or tie means 30 may include a pair of lower and upper, elongate web or strap portions 31 and 32 extending respectively from the lower and upper anchors or brackets 20 and 25. That is, the lower strap portion 31 may have its lower end looped, as at 33 about the U-shaped member 21 of adjacent lower bracket 20, or otherwise suitably secured to the respective lower bracket. The upper end 34 of upper strap portion 32 may similarly be suitably looped about or otherwise secured to the U-shaped member 26 of its adjacent upper bracket 25. Additionally, the upper end 35 of the lower strap portion 31, and the lower end 36 of the upper strap portion 32 may be detachably connected together by suitable fastener means 37.

More specifically, each of the strap parts 31 and 32 are formed with a row or series of aligned through openings, holes or slots, as at 40 and 41, respectively.

As best seen in the exploded view of FIG. 3, the overlapping upper and lower ends 35 and 36 of respective lower and upper straps 31 and 32 may have longitudinally elongate through holes or slots 40 and 41 in alignment with each other. The fastener means 37 may include a shank or neck 42, which may be of generally cylindrical configuration and provided on opposite ends with enlargements or heads 43. The end enlargements or heads 43 may be generally identical and of elongate configuration transverse of the shank 42 and generally parallel to each other. Further, the elongate end enlargements or heads 43 may be of a size and configuration for conforming engagement through the elongate apertures or slots 40 and 41. Thus, with a pair of apertures or slots 40 and 41 in alignment or registry with each other, a fastener head 43 may be engaged through the aligned slots so that shank 42 is received in the slots, and the fastener then turned or rotated 90° to prevent its withdrawal from the slots. In this manner, as illustrated in FIG. 1, the lower and upper strap portions 31 and 32 are detachably connected together at any selected relative position to limit the upward swinging movement of the trunk closure 15 to a desired position.

Also shown in FIG. 1, in dot-and-dash outline, are contents of the trunk 11, say shopping bags, packages, or the like which may rest on the trunk floor 13 and extend upwardly beyond the trunk size 11. The packages or trunk contents 45 are therefore understood to be retained in the trunk by the upwardly swung trunk closure or cover 15 and the rearwardly located strap means 30 extending downwardly from the trunk cover to the trunk floor. In practice, with the contents 45 in position within and extending upwardly beyond the trunk side walls, the strap means 30 may be detachably secured together by fastener means 35 to limit upward trunk movement and assure retention of the contents in position. Of course, the tie means or straps 30 may be disconnected or opened, as by removal of the fastener means 37. This is achieved by substantial reversal of the hereinbefore described connecting procedure. For example, the fastener means 37 may be rotated one-quarter turn to place the elongate heads 43 in alignment with the associated aligned pair of slots 40 and 41, and then withdrawn through the slots.

While the strap or tie means 30 has been illustrated as a pair of separate lower and upper members 31 and 32 in FIGS. 1 and 2, it is appreciated that a single elongate strap element may be employed, say having one end looped or otherwise secured to one of the anchors 20, 25 and extending slidably through the other of the anchors so that its other, free end selectively overlaps an intermediate strap portion for removable extension of a fastener 37 through aligned slots of overlapping strap portions.

A further embodiment is shown in FIGS. 6 and 7, wherein there are shown a pair of strap portions 31a and 32a corresponding to the hereinbefore described strap portions 31 and 32. The strap portion 31a may be formed with the longitudinal array of aligned, longitudinally elongate through apertures or slots 40a. Fixedly secured to the strap part 32a may be fastener means 37a, which may assume the form of a shank, lug or stud 42a outstanding from the strap element 32a and provided on its outer end with an enalrged head 43a. The enlarged end piece or head 43a may be of elongate configuration similar to that of apertures or slots 40a, and is arranged to extend transversely of the strap member 32a.

Thus, with the strap members 31a and 32a in overlapping relation, and arranged to extend transversely with respect to each other, the fastener head 43a may be aligned with and engaged through one of the slots 40a, and the strap members then swung to extend longitudinally of each other.

By this last step the fastener head 43a is made to extend transversely of the strap member 31a across its associated slot 40a, the latter receiving the fastener shank 42a. The longitudinal relationship of strap members 31a and 32a is shown in phantom in FIG. 6. Of course, mere reversal of the abovedescribed procedure may be employed for disconnecting the strap members 31a and 32a.

From the foregoing, it will be appreciated that the present invention provides an accessory for motor vehicle trunks, and the like, which is extremely simple in construction, installation and use, enabling a vehicle trunk to carry an oversize load, while effectively protecting the load and maintaining the same in position.

Although the present invention has been described in some detail by way of illustration and example for purposes of clarity of understanding, it is understood that certain changes and modifications may be made within the spirit of the invention.

What is claimed is:

1. For use in conjunction with an automobile trunk including an upwardly opening luggage chamber, and a swingable closure hingedly connected to said chamber to close said opening, the combination comprising: at least one chamber anchor for securement in the chamber remote from the hinged connection of said closure, at least one closure anchor for securement to the closure remote from said hinged connection, selectively extensile and contractile strap means connected between said anchors, and releasable fastener means detachably securing said strap means in a selected position of extensile and contractile movement, for releasably restraining said closure against opening beyond a selected open position, said strap means comprising a pair of overlying strap regions, at least one of said regions having one longitudinally arranged row of through holes, said holes being elongate longitudinally of said one strap region, and said fastener means comprising a headed element extending transversely of and fixedly connected to the other of said strap regions, said headed element being rotatable relative to said one strap region and removably engageable through a selected one of said holes, for maintaining said strap regions in a selected overlying relation.

2. For use in conjunction with an automobile trunk including an upwardly opening luggage chamber, and a swingable closure hingedly connected to said chamber to close said opening, the combination comprising: at least one chamber anchor for securement in the chamber remote from the hinged connection of said closure, at least one closure anchor for securement to the closure remote from said hinged connection, selectively extensile and contractile strap means connected between said anchors, and releasable fastener means detachably securing said strap means in a selected position of extensile and contractile movement, for releasably restraining said closure against opening beyond a selected open position, said strap means comprising a pair of overlying strap regions, at least one of said regions having one longitudinally arranged row of through holes, said holes being elongate longitudinally of said one strap region, and said fastener means comprising a headed element extending transversely of and connected to the other of said strap regions, said headed element being rotatable relative to said one strap region and removably engageable through a selected one of said holes, for maintaining said strap regions in a selected overlying relation, said other strap region having another longitudinally arranged row of through holes, said other strap region holes being elongate in the direction longitudinally of said other strap region, and said headed element including a pair of elongate generally parallel end heads for removable engagement through registering holes of respective strap regions.

* * * * *